United States Patent [19]

Moore

[11] Patent Number: 4,955,575
[45] Date of Patent: Sep. 11, 1990

[54] TILTING/REMOVABLE SEAT MOUNTING ASSEMBLY

[75] Inventor: Daniel S. Moore, Elkhart, Ind.

[73] Assignee: Boss Manufacturing & Distributing Inc., Elkhart, Ind.

[21] Appl. No.: 360,400

[22] Filed: Jun. 2, 1989

[51] Int. Cl.⁵ ............................................ A47D 19/04
[52] U.S. Cl. ................... 248/398; 248/503.1; 296/65.1; 297/15
[58] Field of Search ............ 248/398, 371, 503, 503.1; 297/15; 296/65.1

[56] References Cited

U.S. PATENT DOCUMENTS

| | | | |
|---|---|---|---|
| 2,005,112 | 6/1935 | Smelker | 248/398 X |
| 4,408,798 | 10/1983 | Mizushima et al. | 297/15 X |
| 4,595,164 | 6/1986 | Froutzis et al. | 248/503.1 X |
| 4,759,580 | 7/1988 | Berklich, Jr. et al. | 248/503.1 X |
| 4,838,513 | 6/1989 | Kondo | 248/503.1 |

Primary Examiner—Ramon O. Ramirez
Attorney, Agent, or Firm—Flynn, Thiel, Boutell & Tanis

[57] ABSTRACT

A pedestal-type mounting assembly for a vehicle seat having a floor plate structure adapted for fixed attachment to the vehicle floor, and a pedestal assembly adapted for hinged or fixed connection to the floor plate structure. The pedestal assembly has a bottom plate which is normally supportably engaged directly on the floor plate structure, and a pedestal projects upwardly from the bottom plate and has a top structure adapted for connection in a conventional manner to a vehicle seat. A hinge structure releasably connects the floor and bottom plates adjacent one edge thereof for defining a horizontal hinge axis to permit tilting of the seat when desired. The hinged structure involves cantilevered hinge pins engaged within hinge support tubes. A manually-releasable lock structure cooperates between the bottom and floor plates adjacent the other edge to fixedly lock the pedestal assembly to the floor plate. When this lock is released, then the seat can be tilted about the hinged axis. When in the unlocked and tilted position, the pedestal assembly and attached seat can be totally disconnected from the floor plate by horizontally sidewardly displacing the pedestal assembly and seat relative to the floor plate to disconnect the hinge structure.

15 Claims, 4 Drawing Sheets

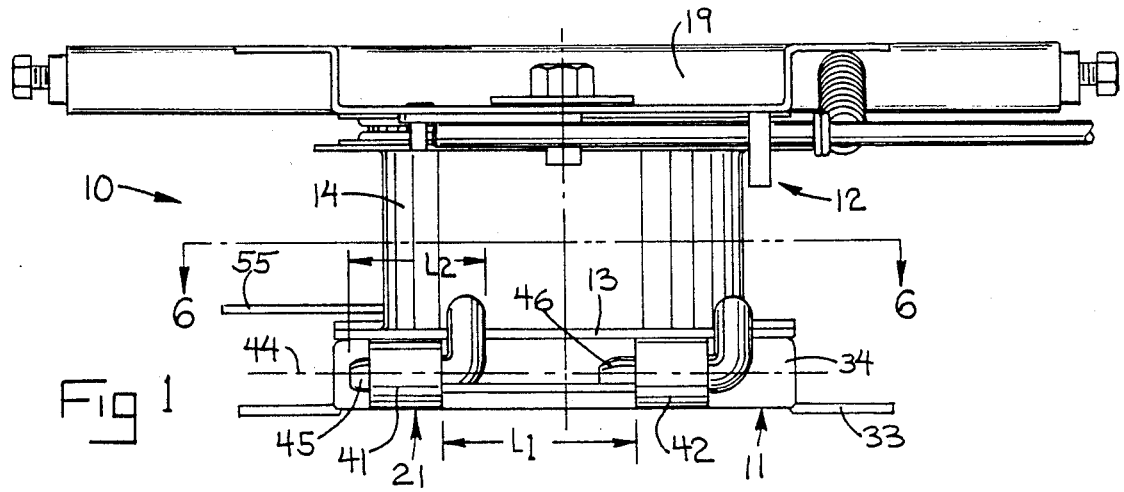
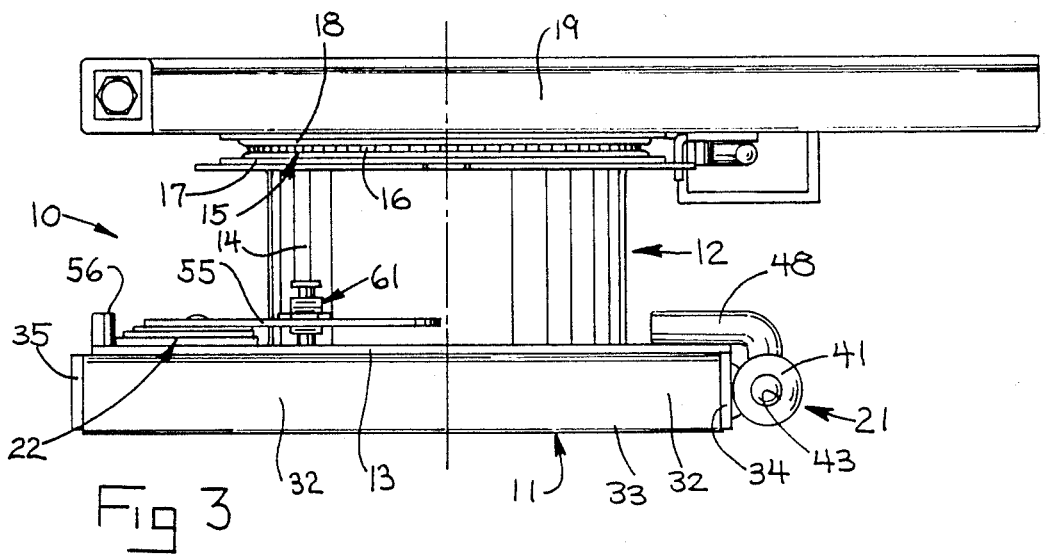
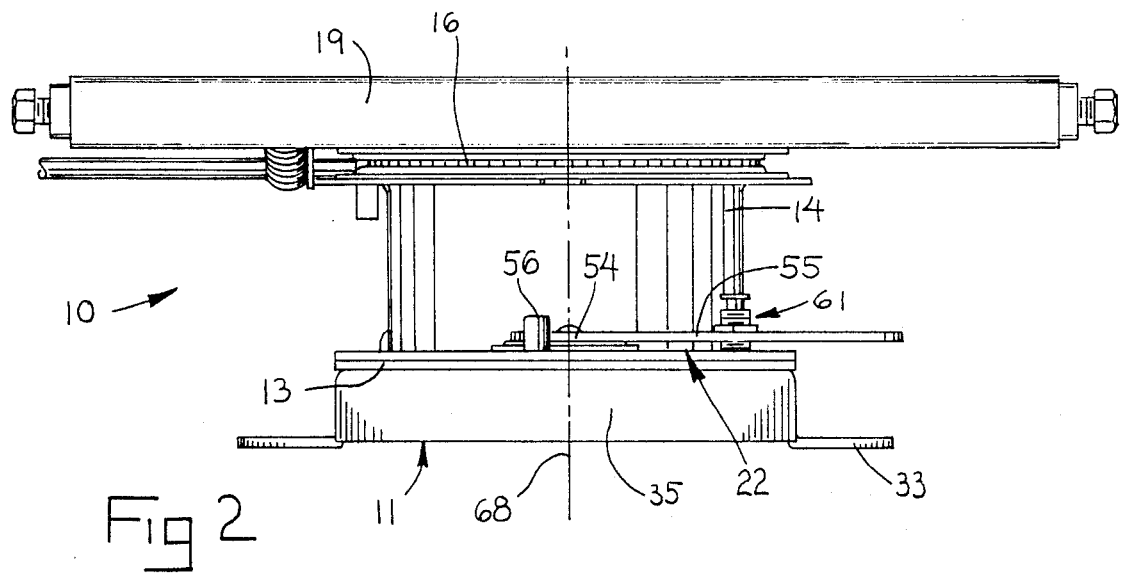

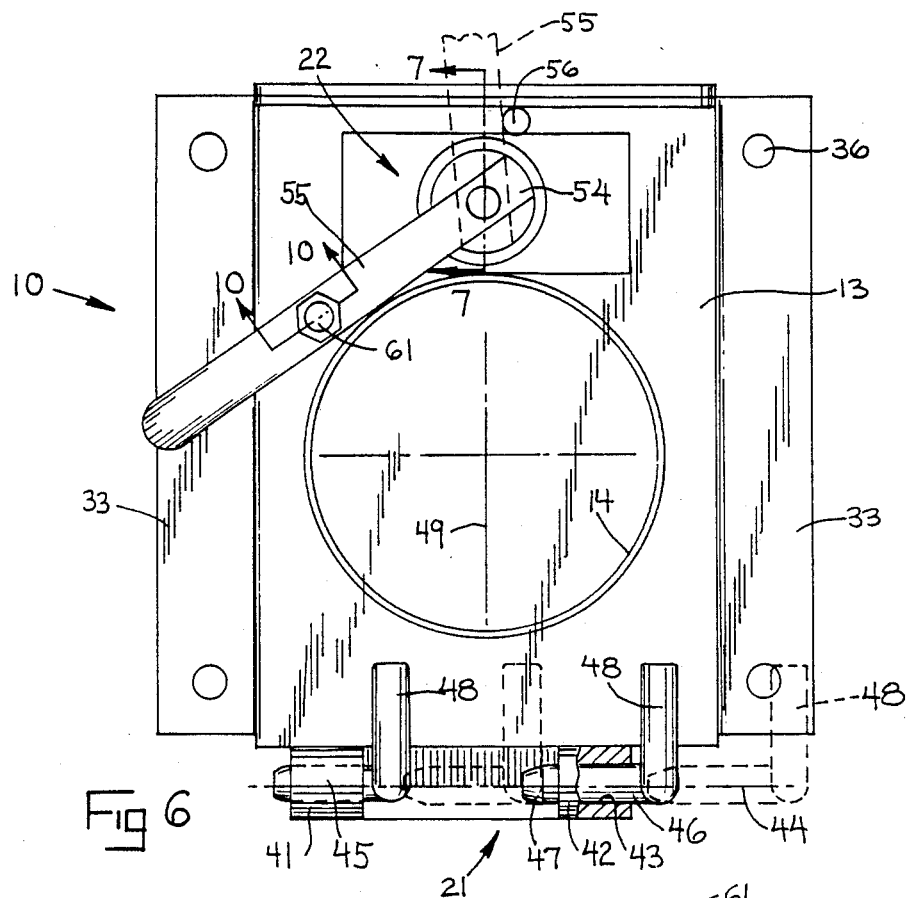
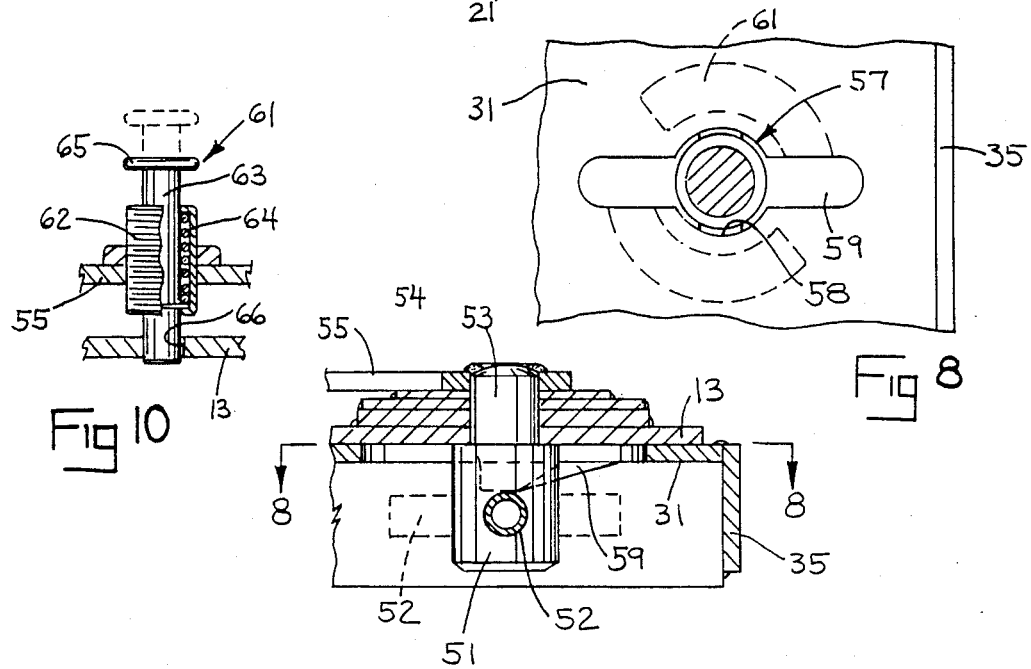
Fig 6
Fig 10
Fig 8
Fig. 7

TILTING/REMOVABLE SEAT MOUNTING ASSEMBLY

FIELD OF THE INVENTION

This invention relates to a seat mounting assembly which is particularly desirable for use in a vehicle such as a van or motor home and, more particularly, to an improved seat mounting assembly which has the capability of being tilted into a folded position and readily detached from the vehicle floor.

BACKGROUND OF THE INVENTION

Seat structures as provided, in vans, motor homes and like vehicles typically employ a pedestal-type mounting assembly which attaches to the vehicle floor and mounts thereon the seat. The pedestal mounting assembly also typically employs a structure for permitting swiveling of the seat, such being conventional.

In many situations it is desirable to provide a seat pedestal mounting assembly which permits tilting of the seat into a "folded" position, such as for facilitating access into or out of the vehicle or servicing of the vehicle. To achieve this folding capability, U.S. Pat. No. 4,667,917 illustrates a seat pedestal employing an inverted boxlike structure which is hinged along the one side thereof to the vehicle floor, and which has an interior pivoted hook adapted for engagement with a U-shaped member secured to the floor to hence fixedly latch the pedestal to the vehicle floor. With this arrangement, release of the hook enables the seat arrangement to be pivoted into a folded position about the hinge pin which extends along one edge of the pedestal. This arrangement, however, is such as to permit total detachment of the seat pedestal only in a laborious and complex manner. More specifically, the edge of the seat pedestal has a pair of spaced hinge knuckles which in turn straddle a further pair of hinge knuckles secured to the vehicle floor, and a single elongate hinge pin extends through these hinge knuckles to hingedly secured the pedestal to the floor. When total detachment of the pedestal from the floor is desired, such is possible only by wholly sidewardly removing the hinge pin from all of the aligned hinge knuckles, and such normally requires use of a tool or other device in order to permit removal of the hinge pin. Such is a complex and labor extensive operation, and requires use of a hammer or like tool, and also requires use of a tool to facilitate removal of a cotter pin which is typically mounted in the free end of the hinge pin.

To facilitate mounting and demounting of a seat pedestal relative to the vehicle floor, U.S. Pat. No. 4,789,126 illustrates a pedestal having a pair of enlarged tabs or flanges which project outwardly from one edge thereof for insertion into and outwardly beyond openings formed in the vehicle floor. The pedestal has a latching handle associated with the other edge thereof so that it is adapted to be inserted through an opening in the floor, with the handle then being rotated to secure the pedestal to the floor. While this arrangement does facilitate mounting and demounting of the pedestal relative to the floor, nevertheless when the handle is released, then the seat pedestal does not possess any hinge structure which permits folding of the seat since any such folding results in the tabs on the pedestal being at least partially withdrawn from the floor openings.

Another van-type pedestal assembly for a seat is disclosed in U.S. Pat. No. 4,805,952. The arrangement of this latter patent is designed to permit both tilting of the seat and removal of the seat without requiring tools. With this arrangement, however, after the lock mechanism has been released, the hinge pins are disposed within elongated slots so that when it desired to fold the seat, the hinge pins are not always positively confined, and thus this increases the risk of the seat accidentally becoming disconnected from the floor. Further, when total disconnection is desired, the entire seat and attached pedestal must be vertically lifted upwardly through vertical slots, and hence this increases the required degree of manual manipulation and effort.

Accordingly, it is an object of the present invention to provide a seat mounting assembly which improves upon and overcomes disadvantages associated with prior seat mounting pedestals, such as the disadvantages noted above.

More specifically, the improved seat pedestal is intended to provide a hinge structure for providing a positive structural yet hinged connection between one edge of the pedestal and the vehicle floor so as to permit positive hinging movement therebetween when folding of the seat arrangement is desired, and yet at the same time provide a releasable latch cooperating between the other edge of the pedestal and the floor to permit fixed securement of the pedestal to the floor in a manner which is structurally and operationally simple. At the same time, the hinge structure can, after release of the latch, be itself easily and readily disconnected without requiring complex manipulations or tools so as to permit total demounting of the seat pedestal if desired.

Other objects and purposes of the invention will be apparent to persons familiar with structures of this general type upon reading the following specification and inspecting the accompanying drawings.

SUMMARY OF THE INVENTION

This invention relates to a seat mounting assembly which has a base or floor plate adapted for rigid securement to the vehicle floor, and a pedestal assembly which mounts the floor plate and projects upwardly therefrom. The pedestal assembly includes a bottom support plate adapted to directly overlie the floor plate. An upright tubular pedestal is fixed to the bottom support plate and at its upper end mounts a conventional swivel bearing arrangement, which in turn mounts a top support plate adapted for securement to the underside of a vehicle seat in a conventional manner. To rigidly but releasably and hingedly join the pedestal assembly to the floor plate, a separable hinge structure joins between the bottom support plate and the floor plate adjacent one edge thereof, and a releasable lock coacts between these same two plates adjacent the other edge thereof. The releasable lock includes an accessible handle which can be manually operated to release the lock and thereby enable the pedestal assembly to be hingedly moved about the floor plate when folding of the seat is desired. When in this latter condition, the hinge structure itself can be readily separated to wholly demount the pedestal assembly merely by sideward displacement of the pedestal assembly relative to the floor plate. For this purpose, the hinge structure, in a preferred embodiment, includes a pair of cantilevered hinge pins which are aligned and project in the same direction, which hinge pins are fixed to one of the plates, and a pair of hinge knuckles which are fixed to the other plate and which slidably and rotatably receive therein the cantilevered hinge pins.

BRIEF DESCRIPTION OF THE DRAWINGS

FIG. 1 is a front elevational view of the improved seat mounting assembly of this invention;

FIG. 2 is a rear elevational view thereof;

FIG. 3 is a left side elevational view thereof;

FIG. 6 is a sectional view taken substantially along line 6—6 in FIG. 1;

FIG. 7 is an enlarged fragmentary sectional view taken substantially along line 7—7 in FIG. 6;

FIG. 8 is a fragmentary view as taken along line 8—8 in FIG. 7 and illustrating the lock-receiving opening formed in the top wall of the floor plate;

FIG. 10 is an enlarged fragmentary sectional view along line 10—10 in FIG. 6.

Figure 4:
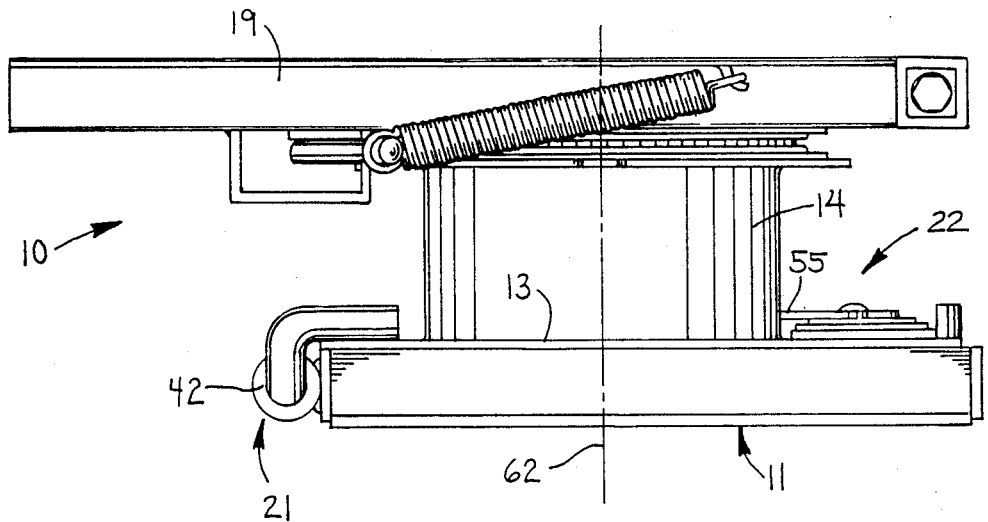
FIG. 4 is a right side elevational view thereof.

Certain terminology will be used in the following description for convenience in reference only, and will not be limiting. For example, the words "upwardly", "downwardly", "rightwardly" and "leftwardly" will refer to directions in the drawings to which reference is made. The word "front" will be used in reference to the structure appearing on the right side of FIG. 3, and the word "rear" will be used with reference to the structure on the left side of FIG. 3. However, it will be appreciated that the mounting of the seat pedestal in the vehicle can obviously be reversed. The words "inwardly" and "outwardly" will refer to directions toward and away from, respectively, the geometric center of the seat pedestal and designated parts thereof. Said terminology will include the words specifically mentioned, derivatives thereof, and words of similar import.

DETAILED DESCRIPTION

Referring to FIGS. 1-4, the seat mounting assembly 10 includes a base or floor plate structure 11 adapted for rigid securement to the vehicle floor. A pedestal assembly 12 is detachably secured to and projects upwardly from the floor plate structure 11. This pedestal assembly 12 includes a bottom support plate 13 having a tubular pedestal 14 projecting upwardly therefrom. Pedestal 14 has a conventional swivel 15 provided on the upper end thereof, which swivel includes a conventional ball bearing 16 confined between a lower race 17 secured to the pedestal 14 and an upper race 18 secured to a top support plate 19. The top support plate 19 is generally conventional and attaches, in a conventional manner, to the underside of a vehicle seat. The swivel 15 is also conventional and enables the seat to be swiveled substantially about a vertical axis 62. The structure of the pedestal 14, the swivel 15 and the top support plate 19 are conventional.

To provide the assembly 10 of this invention with the desired ability to both permit hinging movement of the seat into a folded position, and simple detachment of the seat in its entirety from the vehicle, the pedestal includes a separable hinge structure 21 which couples the plates 11 and 13 adjacent one edge thereof, and a releasable lock structure 22 which couples these plates adjacent the opposite edge thereof.

Considering first the floor plate structure 11, it comprises a vertically shallow, inverted boxlike arrangement having a generally horizontal top plate 31 which at its opposite side edges is provided with vertically short downwardly projecting side walls 32, the latter at their lower edges being provided with sidewardly outwardly projecting mounting flanges 33. The front and rear ends of this boxlike structure are in turn provided with front and rear walls 34 and 35, respectively, which project downwardly from the top wall 31. The mounting flanges 33 are intended to directly overlie either the vehicle floor or frame so as to be fixedly and securely attached thereto, such as by bolts or rivets which extend through suitable openings 36 (FIG. 6) formed in the mounting flanges 33.

Considering now the separable hinge structure 21, same includes a pair of tubular hinge knuckles 41 and 42 which are fixedly secured to the front wall 34 of the floor plate, such as by welding. These hinge knuckles 41 and 42 are generally identical and are disposed so that the openings 43 therethrough are coaxially aligned and define a generally horizontally-extending hinge axis 44 which extends perpendicularly with respect to a central vertical plane 49 (FIG. 6) which extends longitudinally in the front-to-back direction of the seat mounting assembly. These hinge knuckles 41 and 42 are sidewardly spaced apart by a predetermined distance $L_1$.

The hinge structure 21 also includes a pair of hinge pins 45 and 46 which are adapted to be axially slidably and rotatably supported within the openings 43 of the respective hinge knuckles 41 and 42. These hinge pins 45 and 46 are each of a cantilevered construction and they are disposed so as to project coaxially in alignment with one another, with the hinge pins 45 and 46 themselves being coaxially cantilevered in the same direction, namely leftwardly in FIG. 1. The hinge pins 45 and 46, adjacent their free end, are provide with a tapered leading end 47 of reduced diameter to facilitate their slidable insertion through the respective hinge knuckle. The hinge pins 45 and 46 are each provided, at their other ends (rightward ends in FIGS. 1 and 6) with a mounting part 48 which is fixedly secured to the bottom plate 13. This mounting plate 48, in the illustrated embodiment, is an L-shaped rod having one leg which is secured as by welding to the top of plate 13 and another leg which projects downwardly and is integrally joined to the respective hinge pin. Hence, each hinge pin and its respective mounting part can be integrally formed in one piece from rod stock. The hinge pin 45 has a maximum transverse extent $L_2$ which is at least slightly less than the spacing $L_1$ to permit the hinge structure to be readily connected or disconnected.

In hinge structure 21 form as described above, the hinge defined by knuckle 41 and hinge pin 45, and the other hinge defined by knuckle 42 and hinge pin 46, are disposed on opposite sides of the central longitudinally extending vertical plane 49, and these two hinges 41, 45 and 42, 46 are nonsymmetrical relative to this plane.

Considering now the lock structure 22, it includes a manually engageable handle rotatably supported on the bottom support plate 13 and provided with a lock member which is releasably engageable with a lock portion formed on the floor plate 11.

More specifically, the releasable lock structure 22 includes a generally cylindrical lock member 51 (FIG. 7) which projects perpendicularly downwardly from the bottom support plate 13 closely adjacent but spaced slightly inwardly from the rear edge thereof. This lock member 51 includes a lock pin 52 which is fixed thereto and extends horizontally and transversely thereacross so that opposite ends of the pin 52 project radially outwardly from diametrically opposite sides of the cylindrical lock member 51. The lock member 51 and its lock pin 52 hence define a generally cross-shaped structure. The lock member 51 has a reduced-diameter shaft part 53 which projects upwardly through and is rotatably supported on the bottom support plate 13. This shaft part 53 has the upper end thereof nonrotatably fixed to a flatten end part 54 of a handle 55. The handle 55 projects generally horizontally outwardly away from the generally vertical rotational axis of the lock member 51 and is disposed so as to be readily accessible but closely overlies the upper surface of the bottom support plate 13. The handle 55 is normally disposed so that it is positioned closely adjacent the pedestal 14 when the lock structure is in the locked position, as illustrated by solid lines in FIG. 6. However, the handle 55 can be manually gripped and horizontally swung outwardly so as to abut a stop 56 which is secured to and projects upwardly from the plate 13, this position of the handle as indicated by dotted lines in FIG. 6 corresponding to the unlocked position.

The lock handle 55 and its lock member 51 cooperate with a lock portion provided in the top wall 31 of the floor plate 11, which top wall 31 includes a generally keyhole-shaped opening 57 (FIG. 8) formed vertically therethrough. This opening 57 includes a main generally cylindrical opening 58 of a diameter which is slightly greater than the diameter of the cylindrical lock member 51. A pair of slotlike openings 59 project outwardly from diametrically opposite sides of the opening 57, which slotlike openings 59 accommodate the passage therethrough of the outwardly projecting lock pins 52. The lock portion also preferably but not necessarily includes ramplike cams 61 which are formed on the underside of top plate 31 directly adjacent the opening 57 and which extend circumferentially away from the slots 59 so as to create a snug engagement with the lock pins 52 when the lock structure is engaged.

The handle 55 also mounts thereon a safety latch 61 for securing the handle in the locked position of FIG. 6. This latch 61 is mounted on the handle at a location spaced radially outwardly from the lock member 51, and includes a sleeve or shroud 62 which is fixed to and penetrates the handle. A latch pin 63 slidably projects through the sleeve 62 and is normally urged downwardly by a spring 64. The latch pin 63 has an enlarged gripping head 65 on the upper end thereof. The lower free end of pin 63 is adapted to project into an opening 66 formed in the base plate 13 when the handle 55 is in the locked position.

OPERATION

The operation will be briefly described to ensure a complete understanding thereof.

When the floor plate 11 is fixed to the vehicle floor and the seat mounting assembly is in the fully assembled and locked position illustrated by FIGS. 2-4, the seat (not shown) as mounted on the top plate 19 is fixedly anchored relative to the vehicle/floor but does have capability of swiveling about the vertical axis 68 due to the swivel bearing 15.

If the vehicle occupant wishes to tilt the seat so as to facilitate the access of people into or out of the van, then such tilting can be readily accomplished merely by grasping the handle 55 (which in a locked position is normally fairly inconspicuous due to its location beneath the seat), releasing the latch 61 by lifting the pin 63 upwardly to release it from the hole 66, and then manually swinging the handle outwardly until it abuts the stop 56, such as illustrated by the dotted-line position of the handle in FIG. 6. This swinging of the handle rotates the lock member 51 so that lock pins 52 are then hence aligned with the radial slots 59. The occupant then manually pushes against the seat so as to pivot it about the axis 44, thereby pivoting the pedestal assembly 12 relative to the base plate 11, as illustrated by FIG. 9.

When it is desired to reposition and relock the seat, then the seat is reversely pivoted and the lock structure again locked by manually returning the handle 55 to the locked position illustrated by solid lines in FIG. 6. The latch 61 will automatically engage when the handle is returned to the locked position.

Figure 9:
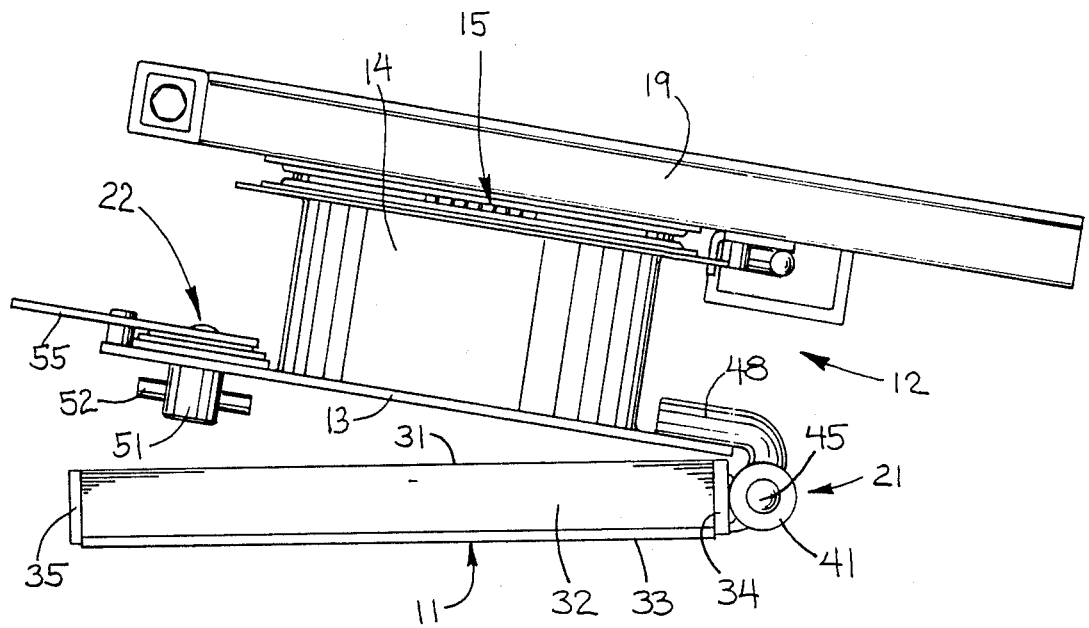
FIG. 9 is a side elevational view corresponding to FIG. 3 but showing the lock released and pedestal assembly in a partially tilted position.
Figure 5:
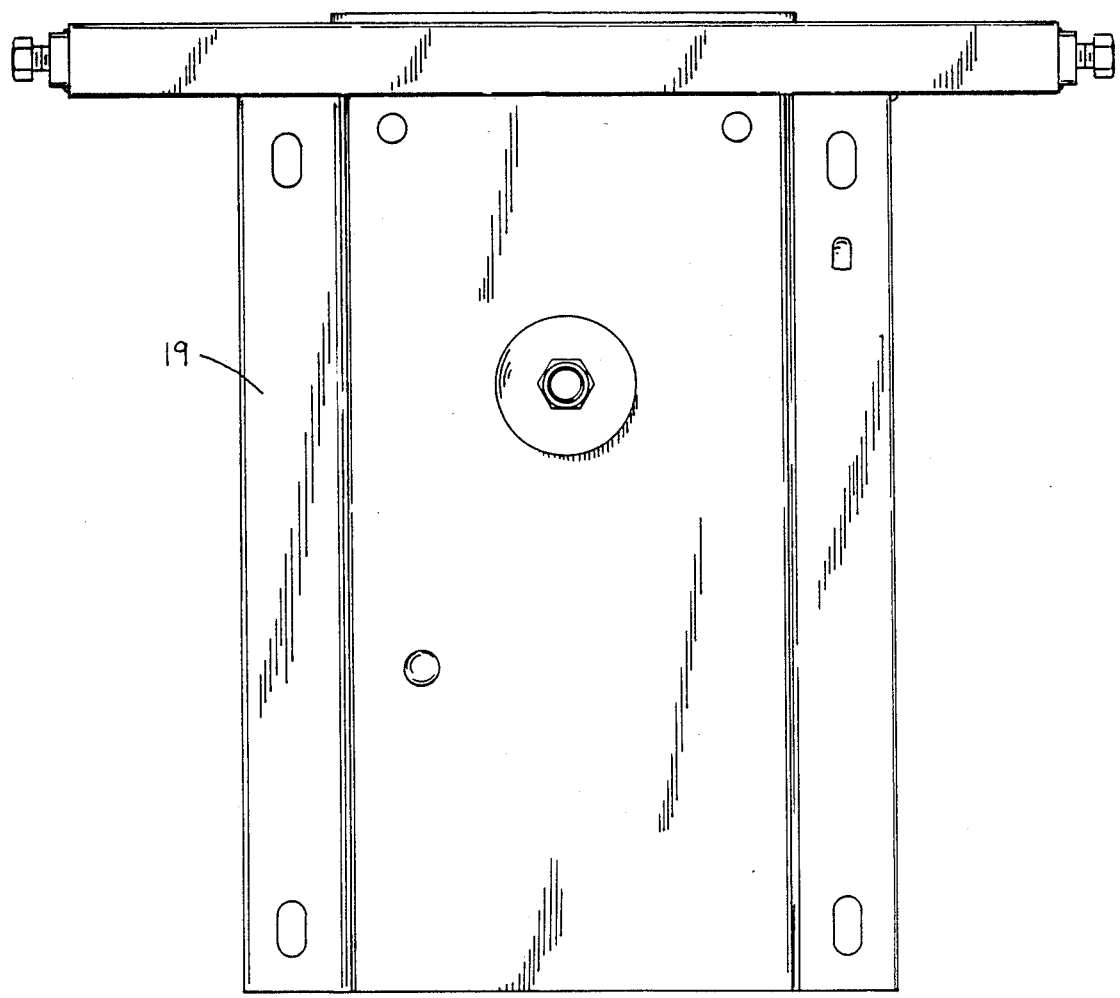
FIG. 5 is a top view thereof.

On the other hand, if it is desired to totally disconnect the seat from the van floor, such as for the purpose of removing the seat to provide greater cargo space, then the lock structure 22 is again initially unlocked and the seat pivoted upwardly into a titled position substantially as illustrated by FIG. 9. When in this released and titled position, then the seat and attached pedestal assembly 12 are slidably displaced sidewardly (rightwardly in FIGS. 1 and 6) so as to cause the cantilevered hinge pins 45 and 46 to be slidably removed from the respective hinge knuckles 41 and 42, such position being diagrammatically illustrated by dotted lines in FIG. 6. When in this latter position, the seat and attached mounting assembly are hence totally disconnected from the floor plate 11 and hence can be readily removed from the vehicle. Such total disconnection can hence be accomplished quickly and easily with minimum manual effort and without requiring removal of fasteners or the like.

The seat assembly can be readily reassembled to the vehicle by reversing the sequence described above, which reassembly can be accomplished without requiring any tools and with minimal time and effort.

Further, when the seat and attached mounting assembly is disconnected, only the floor plate 11 remains, and it presents a low and generally unobstructive arrangement since it is a minimal height, and the hinge knuckles 41 and 42 themselves are attached to the end wall 34 thereof so as to be disposed below the upper surface of the top wall 13.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A pedestal-type mounting assembly for a vehicle seat to permit the seat to be both tilted relative to the vehicle floor and easily removed from the vehicle without use of tools, said mounting assembly comprising:

a base plate structure having front and rear edges and being adapted for fixed attachment to a vehicle floor;

a pedestal assembly positioned on and projecting upwardly from said base plate structure, said pedestal assembly having means associated with an upper end thereof for attachment to a vehicle seat, and said pedestal assembly having a support structure adjacent the lower end thereof adapted for supportive bearing engagement with said base plate structure;

releasable hinge means operably connected between said support structure and said base plate structure adjacent one of said edges for defining a generally horizontally and sidewardly extending hinge axis;

manually-releasable lock means cooperating between said support structure and said base plate structure adjacent the other edge thereof for fixedly but releasably connecting said pedestal assembly and said base plate structure together;

said manually-releasable lock means including a lock portion stationarily secured relative to said base plate structure and a lock member movably supported on said support structure for releasable engagement with said lock portion when the support structure is supportably engaged with said base plate structure, said lock means also including a manually-engageable handle connected to said lock member for effecting movement thereof, said handle being readily accessible and supported for swinging movement relative to the pedestal assembly between locked and unlocked positions;

said hinge means including a hinge tube fixed to one of said support and base plate structures and defining therein a generally horizontally and sidewardly extending cylindrical opening whose axis defines said hinge axis, and said hinge means including a generally horizontally elongated and sidewardly extending hinge pin fixed to the other of said support and base plate structures, said hinge pin being of a horizontally and sidewardly projected cantilevered structure having a free end so as to be slidably insertable into or out of the opening in said hinge tube, said hinge pin adjacent the other end thereof being permanently fixedly secured relative to the other of said support and base plate structures;

whereby said pedestal assembly and a seat attached thereto can be tilted about the hinge axis when the lock means is released, and whereby the pedestal assembly and attached vehicle seat can be totally disconnected from the floor plate structure when in the tilted position merely by horizontally sidewardly displacing the pedestal assembly relative to the floor plate structure to slidably withdraw the cantilevered hinge pin from the hinge tube.

2. A seat mounting assembly according to claim 1, wherein said hinge structure includes a pair of said hinge tubes disposed in fixed relationship to one another, said pair of hinge tubes being horizontally and sidewardly spaced from one another with the openings therein being horizontally coaxially aligned, and a pair of said hinge pins disposed in fixed relationship to one another, said hinge pins being horizontally and sidewardly spaced and disposed so as to be substantially coaxially aligned, each of said hinge pins being of a cantilevered structure and oriented so that the free ends of the cantilevered hinge pins project coaxially in the same direction.

3. A seat mounting assembly according to claim 2, wherein said hinge tubes are fixed to said base plate structure, and said hinge pins are fixed to said support means structure.

4. A seat mounting assembly according to claim 3, wherein said base plate structure is a shallow and inverted boxlike structure having a top wall which at opposite side edges terminates in low-height sidewalls which project downwardly and which join to outwardly extending side flanges disposed for overlying the vehicle floor, said boxlike structure also having front and rear walls which project downwardly from the top wall, and said hinge tubes being fixedly secured to one of said front and rear walls so as to be disposed at an elevation below said top wall.

5. A seat mounting assembly according to claim 4, wherein said support means structure comprises a bottom plate disposed so as to be supported on and overlie the top wall of said base plate structure, said cantilevered hinge pins being permanently and fixedly secured to said bottom plate and being disposed in downwardly spaced relationship therefrom for cooperative engagement with the hinge tubes.

6. A seat mounting assembly according to claim 5, wherein the lock portion associated with said base plate structure comprises a keyhole-shaped opening formed through said top wall, and said lock member being rotatably supported on and projecting downwardly from said bottom plate for insertion through said keyhole-shaped opening.

7. A seat mounting assembly according to claim 5, including spring-urged latch means mounted on said handle and latchingly engageable with said support structure when said handle is in said locked position.

8. A seat mounting assembly according to claim 3, including spring-urged latch means mounted on said handle and latchingly engageable with said support structure when said handle is in said locked position.

9. A mounting assembly for a seat to permit the seat to be both tilted relative to a floor and easily disconnected from the floor, said mounting assembly comprising:

a base plate structure having opposite edges and being adapted for fixed attachment to a floor;

a seat support positioned on and projecting upwardly from said base plate structure, said seat support having means associated therewith for attachment to a seat, and said seat support having support structure positioned for supportive bearing engagement with said base plate structure;

releasable hinge means operably connected between said support structure and said base plate structure adjacent one of said edges for defining a generally horizontally extending hinge axis which extends generally along said one edge;

lock means cooperating between said support structure and said base plate structure adjacent the other edge thereof for fixedly but releasably connecting said seat support and said base plate structure together, said lock means including a lock portion stationarily secured relation to said base plate structure and a lock member movably supported on said seat support for releasable engagement with said lock portion when the support structure is supportably engaged with said base plate structure;

a manually-engageable handle connected to said lock member for effecting movement thereof, said handle being readily accessible and swingable relative to the seat support between locked and unlocked positions;

said hinge means including a hinge tube fixed to one of said support and base plate structure and defining therein a generally horizontally and sidewardly extending cylindrical opening whose axis defines said hinge axis, and said hinge means including a generally horizontally elongated and sidewardly extending hinge pin fixed to the other of said base plate and support structures, said hinge pin being of a horizontally and sidewardly projected cantilevered structure having a free end so as to be slidably insertable into or out of the opening in said hinge tube, said hinge pin adjacent the other end thereof being permanently fixedly secured relative to the other of said base plate and support structure;

whereby said seat support and a seat attached thereto can be tilted about the hinge axis when the lock means is released, and whereby the seat support and attached seat can be totally disconnected from the floor plate structure when in the tilted position by horizontally displacing the seat support relative to the floor plate structure along the direction of the hinge axis to slidably withdraw the cantilevered hinge pin from the hinge tube.

10. A mounting assembly according to claim 9, wherein said hinge structure includes a pair of said hinge tubes disposed in fixed relationship to one another, said pair of hinge tubes being horizontally and sidewardly spaced from one another with the openings therein being horizontally coaxially aligned, and a pair of said hinge pins disposed in fixed relationship to one another, said hinge pins being horizontally and sidewardly spaced and disposed so as to be substantially coaxially aligned, each of said hinge pins being of a cantilevered structure and oriented so that the free ends of the cantilevered hinge pins project coaxially in the same direction.

11. A mounting assembly according to claim 10, wherein said hinge tubes are fixed to said base plate structure, and said hinge pins are fixed to said seat support.

12. A mounting assembly according to claim 10, including spring-urged latch means mounted on said handle and latchingly engageable with said seat support when said handle is in said locked position.

13. A mounting assembly according to claim 10, wherein said support structure comprises a bottom plate disposed so as to be supported on and overlie the base plate structure.

14. A mounting assembly according to claim 13, wherein said handle is disposed above and pivotally supported on said bottom plate for swinging movement about a generally vertical axis.

15. A mounting assembling according to claim 14, including spring-urged latch means mounted on said handle and latchingly engageable with said bottom plate when said handle is in said locked position.

* * * * *